United States Patent
Bandhakavi et al.

(10) Patent No.: US 11,423,444 B2
(45) Date of Patent: Aug. 23, 2022

(54) PROPENSITY MODEL

(71) Applicant: International Business Machines Corporation, Armonk, NY (US)

(72) Inventors: Sainath Bandhakavi, Hyderabad (IN); Harish Bharti, Pune (IN); Sandeep Sukhija, Sri Ganganagar (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/993,327

(22) Filed: Aug. 14, 2020

(65) Prior Publication Data
US 2022/0051296 A1   Feb. 17, 2022

(51) Int. Cl.
| G06Q 30/02 | (2012.01) |
| G06Q 30/00 | (2012.01) |
| G06Q 50/06 | (2012.01) |
| G06F 16/906 | (2019.01) |
| G06F 16/9035 | (2019.01) |

(52) U.S. Cl.
CPC ....... *G06Q 30/0271* (2013.01); *G06F 16/906* (2019.01); *G06F 16/9035* (2019.01); *G06Q 30/016* (2013.01); *G06Q 50/06* (2013.01)

(58) Field of Classification Search
CPC .................................................. G06Q 30/02
See application file for complete search history.

(56) References Cited

U.S. PATENT DOCUMENTS

| 8,165,920 | B2* | 4/2012 | Goel | G06Q 30/0601 |
| | | | | 705/26.1 |
| 8,688,557 | B2* | 4/2014 | Rose | G06Q 40/00 |
| | | | | 705/36 R |
| 11,086,856 | B2* | 8/2021 | Davies | G06F 21/6254 |
| 2009/0177644 | A1* | 7/2009 | Martinez | G06Q 30/0201 |
| | | | | 707/999.005 |
| 2015/0032610 | A1 | 1/2015 | Crowley et al. | |
| 2016/0132913 | A1 | 5/2016 | Hanjrah et al. | |
| 2016/0203569 | A1 | 7/2016 | Forbes, Jr. et al. | |
| 2017/0178256 | A1 | 6/2017 | Albert et al. | |

(Continued)

FOREIGN PATENT DOCUMENTS

| AU | 2015345985 A1 * | 3/2017 | ............ G06Q 30/02 |
| WO | 2002027616 A1 | 4/2002 | |

OTHER PUBLICATIONS

Gharibshah, Zhabiz; Zhu, Xingquan, User Response Prediction in Online Advertising (English), Jan. 6, 2021 (Year: 2021).*

(Continued)

*Primary Examiner* — Marilyn G Macasiano
(74) *Attorney, Agent, or Firm* — Stosch Sabo

(57) ABSTRACT

Described are techniques including a method comprising generating customer profiles in a profile datastore and selecting a subset of the customer profiles for storing in a candidate profile datastore based on qualifier constraints in a qualifier model. The method further comprises scoring the subset of the customer profiles using a scoring algorithm and determining, for each of the subset of the customer profiles, a respective preferred communication channel. The method further comprises transmitting, in an order according to a rank based on the scoring, electronic communications to a subset of the customer profiles using the respective preferred communication channels.

19 Claims, 13 Drawing Sheets

300 ⟶

| Sl. No | Qualifier constraint | Action |
|---|---|---|
| 1 | Customer connection category is Small or Large Industrial | Eliminate record |
| 2 | Premise residents do not satisfy age criteria | Eliminate record |
| 3 | Premise usage category is hospital/ medical services | Eliminate record |
| 4 | Current contract for the premise is Prepayment | Eliminate record |
| 5 | Customer connection category is residential or small commercial | Keep record |
| 6 | Installed electricity meter is CT based | Eliminate record |
| 7 | Customer recently switched from prepaid plain to postpaid plan | Eliminate record |
| 8 | Ongoing contract for that premise is accrual-based post payment | Eliminate record |
| 9 | Customer recently switched from accrual-based payment plan | Eliminate record |

(56) References Cited

U.S. PATENT DOCUMENTS

2018/0150811 A1 5/2018 Smith et al.
2019/0372345 A1 12/2019 Bain et al.

OTHER PUBLICATIONS

Mell et al., "The NIST Definition of Cloud Computing", Recommendations of the National Institute of Standards and Technology, Sep. 2011, 7 pages.

* cited by examiner

300

| Sl. No | Qualifier constraint | Action |
|---|---|---|
| 1 | Customer connection category is Small or Large Industrial | Eliminate record |
| 2 | Premise residents do not satisfy age criteria | Eliminate record |
| 3 | Premise usage category is hospital/ medical services | Eliminate record |
| 4 | Current contract for the premise is Prepayment | Eliminate record |
| 5 | Customer connection category is residential or small commercial | Keep record |
| 6 | Installed electricity meter is CT based | Eliminate record |
| 7 | Customer recently switched from prepaid plain to postpaid plan | Eliminate record |
| 8 | Ongoing contract for that premise is accrual-based post payment | Eliminate record |
| 9 | Customer recently switched from accrual-based payment plan | Eliminate record |

FIG. 3

| Sl. No | Influence parameter | MoI Value | Parameter type and Business Reason for Score |
|---|---|---|---|
| 1 | Premise has smart meter installed | High Positive | Profile variable |
| 2 | Premise has digital/ mechanical meter installed | Low Positive | Profile variable (Additional cost to utility since meter needs to be replaced) |
| 3 | Premise is tagged to a tenant as the resident | Medium Positive | Profile variable |
| 4 | Premise is tagged to owner as the resident | Low Positive | Profile variable |
| 5 | More than one instance of payment towards bill made after due date in last 6 months | High Positive | User action |
| 6 | Never missed a due date for payment towards bill | Low Negative | User action |
| 7 | Customer enquired earlier about prepayment offers from utility (captured from CRM history, or call recordings) | Medium Positive | User action |
| 8 | Customer uses Utility mobile app to make payments | Medium Positive | Profile variable |
| 9 | Customer makes payments at walk in payment counters | Low Negative | User action |
| 10 | Premise is located in an area with a population density above a threshold | Medium Positive | Regional Constant (SLAs for any reconnection can be met with adequate field force available) |
| 11 | Premise located in an area with a population density below a threshold | High Negative | Regional Constant (SLAs for reconnection difficult to be met) |
| 12 | Customer sentiment is positive (e.g., based on tone analysis from previous calls) | Medium Positive | User action |
| 13 | Customer sentiment is negative (based on tone analysis from previous calls) | Medium Negative | User action |
| 14 | Customer is interested in new offers (based on length of previous outgoing marketing calls for new offers/ products) | Medium Positive | User action |

| Sl. No | Influence parameter | MoI Value | Business Reason for Score |
|---|---|---|---|
| 15 | Customer has made a number of complaints above a threshold (e.g., more than average number across customer base) | Low Negative | User action |
| 16 | Customer has prepaid mobile connection | Medium Positive | Profile variable |
| 17 | Customer has postpaid mobile connection | Low Negative | Profile variable |
| 18 | Customer's connections on social profile have prepaid electricity connection | Medium Positive | Profile variable |
| 19 | Customer's neighbors have prepaid electricity connection or accrual-based post payment model | High Positive | Profile variable |
| 20 | More than a threshold percentage of customers in customer's locality are using prepaid or accrual-based post payment electricity connection | High Positive | Profile variable |
| 21 | Customer's usage analysis has periods (e.g., 15-day periods) where consumption is less than a threshold percentage of average monthly usage | High Positive | Profile variable (Customer either travels frequently or uses this premise as second home) |
| 22 | Customer has used prepaid electricity connection or accrual-based payment model in another premise associated with the customer | High Positive | User action |
| 23 | Premise energy usage high during peak periods | Medium Positive | Profile variable (Utility spends more for power procurement during peak periods not offset by revenue from customer. Customers may avoid/delay payment of relatively high bills |
| 24 | Premise is of service apartment category | High Positive | Profile Variable |
| 25 | Customer sentiment indicating billing concerns from social media | High Positive | User action |

| Sl. No | Way to influence channel | Way to influence channel symbol | Remarks |
|---|---|---|---|
| 1 | SMS | Sms | • Send promotional text message |
| 2 | Email | Eml | • Send promotional email message |
| 3 | Push notification | Pnf | • Send promotional mobile push notifications |
| 4 | Phone call | Pc | • Call customer via phone to discuss promotions |
| 5 | Redemption vouchers | Rv | • Offer redemption vouchers to customers that opt for promotions |
| 6 | Social media | smed | • Send promotional posts to customers on social media<br>• Offer redemption vouchers to customers, via social media, that opt for promotions |

FIG. 9

| Sl. No | Way to influence parameter | Way to influence adder | Way to influence increment |
|---|---|---|---|
| 1 | Preferred communication mode chosen by customer in profile | Increment 1 count for respective way to influence channel | Count(respective way to influence) =Count (respective way to influence)+1 e.g. if sms, then count{sms}=count{sms}+1 |
| 2 | Customer responded after receiving a promotional SMS | Increment 1 count for SMS | Count{sms}=count{sms}+1 |
| 3 | A customer's social media connection opted for one of the varied payment models, and customer has a number of interactions above a threshold with this connection | Increment 1 count for social media | Count{smed}=count{smed}+1 |
| 4 | Customer has used gift vouchers in the past for payment of electricity bill or water bill or gas bill | Increment 1 count for redemption voucher | Count{rv}=count{rv}+1 |
| 5 | Customer has used gift vouchers in the past at utility's partner organizations | Increment 1 count for redemption voucher | Count{rv}=count{rv}+1 |
| 5 | Channel used in the past during which customer opted for a promotion | Increment 1 count for respective way to influence channel | Count(respective way to influence) =Count (respective way to influence)+1 e.g. if sms, then count{sms}=count{sms}+1 |
| 6 | Customer has subscribed to utility's social media page | Increment 1 count for social media | Count{smed}=count{smed}+1 |
| 7 | Customer has positive interactions with utility's social media page | Increment 1 count for social media | Count{smed}=count{smed}+1 |
| 8 | Customer has previously interacted by email | Increment 1 count for email | Count{em}=count{em}+1 |
| 9 | Customer has previously interacted by phone | Increment 1 count for phone call | Count{pc}=count{pc}+1 |

FIG. 10

PROPENSITY MODEL

BACKGROUND

The present disclosure relates to ranking propensity and efficient electronic interactions, and, more specifically, to a propensity model for utility payments and for efficient and effective electronic communications to customers regarding alternative or additional products or services.

Customers, clients, and consumers can choose from a variety of products and/or services when making purchases. One challenge for businesses is to efficiently and effectively enable customers to select the right product or service. Another challenge for businesses is to efficiently and effectively notify customers that may desire to switch, upgrade, or otherwise change an existing product or service to another product or service.

SUMMARY

Aspects of the present disclosure are directed toward a computer-implemented method comprising generating customer profiles in a profile datastore and selecting a subset of the customer profiles for storing in a candidate profile datastore based on qualifier constraints in a qualifier model. The method further comprises scoring the subset of the customer profiles using a scoring algorithm. The method further comprises determining, for each of the subset of the customer profiles, a respective preferred communication channel. The method further comprises transmitting, in an order according to a rank based on the scoring, electronic communications to a subset of the customer profiles using the respective preferred communication channels.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 3 illustrates a table of example qualifier constraints, in accordance with some embodiments of the present disclosure.

FIG. 5 illustrates a table of an example influence parameter datastore, in accordance with some embodiments of the present disclosure.

FIG. 6 illustrates another table of additional influence parameters in an example influence parameter datastore, in accordance with some embodiments of the present disclosure.

FIG. 9 illustrates a table of example communication channels, in accordance with some embodiments of the present disclosure.

FIG. 10 illustrates a table of an example communication influence parameters datastore, in accordance with some embodiments of the present disclosure.

Figure 1:
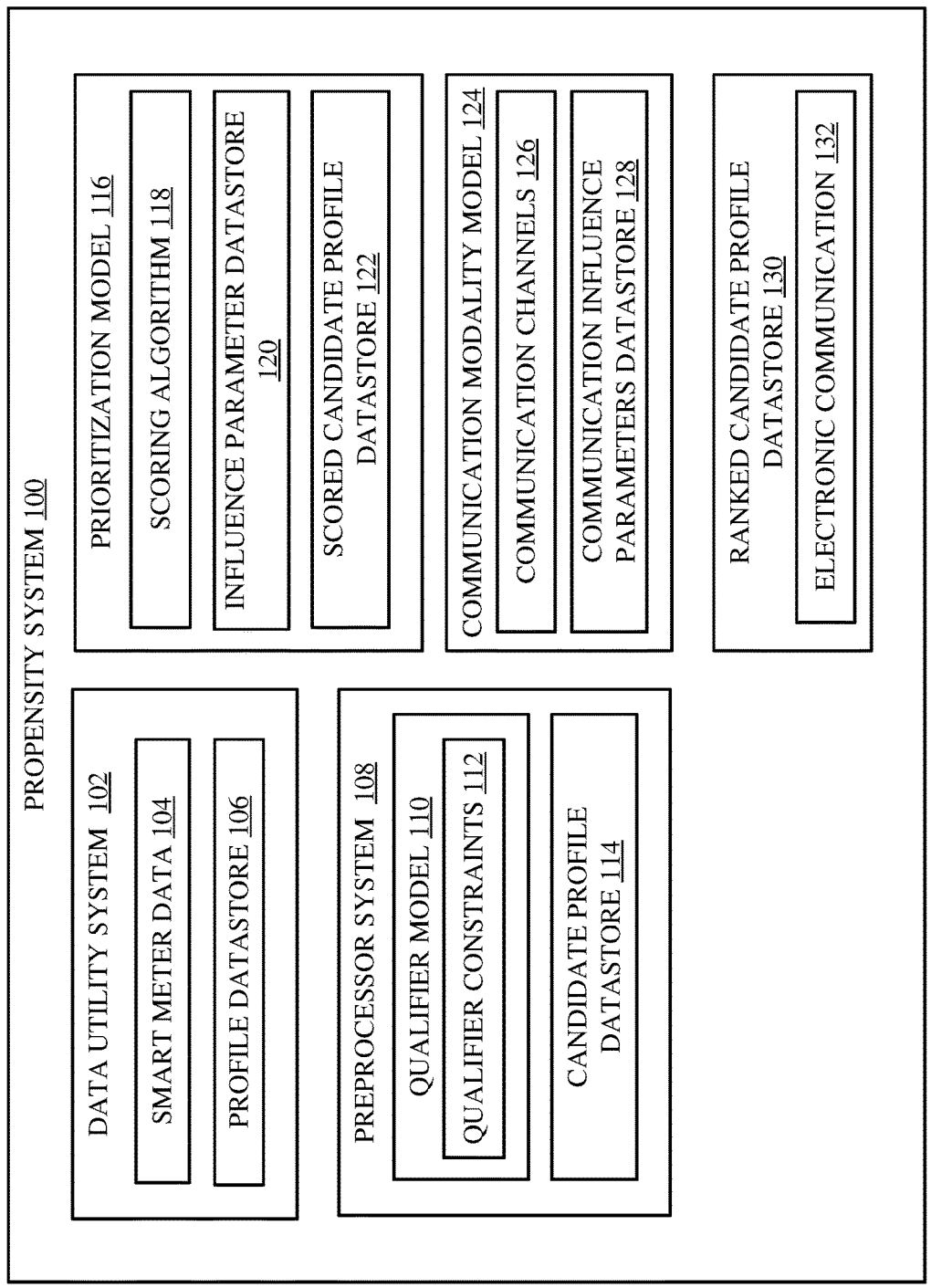
FIG. 1 illustrates a block diagram of an example propensity system, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward ranking propensity and efficient electronic interactions, and, more specifically, to a propensity model for utility payment models and for efficient and effective electronic communications to customers regarding alternative or additional products or services. While not limited to such applications, embodiments of the present disclosure may be better understood in light of the aforementioned context.

Typically, utilities (e.g., electricity distribution services) can provide services based on predefined rates, but utilities can also offer additional services that consumers can opt into such as, for example, prepayment models, time-of-use models, demand-based models, and/or other types of usage, billing, and/or payment models. These optional services can be beneficial for both utilities and consumers. For example, these optional services can realize various benefits such as, but not limited to, reduced operational costs for the utilities, improved cash flow for the utilities, increased predictability for the customers, and/or other benefits.

With the advent of smart metering, delivering such optional alternative usage, billing, and/or payment models has become more efficient and accurate insofar as customers signing up for such optional alternative usage, billing, and/or payment models do not necessarily require site visits, meter changes, or other labor-intensive interactions or capital-intensive expenditures. Nonetheless, the benefits of these alternative usage, billing, and/or payment models can be a function of the number of customers that utilize them. Said another way, despite these benefits being realized by individual customers, utilities need a sufficient number of customers to enroll for these services in order for the utility to tangibly realize benefits (e.g., sufficient customers must opt-in to offset the additional overhead of managing these additional payment models). In order to increase the number of consumers opting into such alternative usage, billing, and/or payment models, the utilities must selectively identify and notify those customers that are most likely to pursue one of the alternative usage, billing, and/or payment models. Numerous factors may play a role in identifying customers that are most likely to pursue one of the alternative usage, billing, and/or payment models such as, but not limited to, historical usage, usage trend, payment trends, demographic information, and/or other information.

Broadly speaking, aspects of the present disclosure are directed to calculating a propensity of customers to opt-in to additional or alternative products or services (e.g., alternative payment models, service add-ons, etc.). Consumers with higher opting propensity can be selected for marketing campaigns which may result in a higher success rates due to their selective distribution to customers that have a higher opting propensity. The options available for opt-in can include alternative payment models such as, but not limited to, a prepayment model, an accrual-based payment model, and/or other models. In a prepayment model, a customer can pay in advance for their usage. In some embodiments, the prepayment is an equal payment representing an average of the customer's historical usage. In an accrual-based model, the customer can make payments when its usage reaches a given threshold.

Aspects of the present disclosure generally include operations of (i) collecting customer data; (ii) utilizing qualification constraints to eliminate customers that do not qualify for the additional or alternative products or services; (iii) calculating (e.g., using a scoring algorithm) each user's propensity for the additional or alternative products or services; (iv) determining a communication channel for electronically communicating with the customer; (v) sending electronic communications to the customers using the preferred communication channel and in an order based on the user's propensity for choosing the additional or alternative products or services; and/or (vi) performing model refinement through continuous learning.

Although the present disclosure is discussed with examples primarily directed toward utility payment models, aspects of the present disclosure are relevant to a wide variety of other businesses, services, and/or industries that can utilize marketing campaigns to strategically notify customers of products, services, upgrades, and/or alternatives that they may be interested in, benefit from, or otherwise value. A non-limiting list of examples includes, but is not limited to, other utility providers (e.g., water utilities, waste-removal utilities, internet providers, telephone providers, etc.), product providers (e.g., cellphone providers, automotive dealerships, etc.), insurance providers (e.g., automotive insurance, home insurance, life insurance, etc.), financial providers (e.g., banks, credit unions, etc.), subscription-based companies (e.g., media providers, virtualized computational, storage, and/or networking services providers, professional associations, social or professional networks, etc.), and/or other types of companies and/or industries.

Referring now to FIG. 1, illustrated is a propensity system 100 for automatically identifying and strategically interacting with customers regarding additions or alterations to their accounts. The propensity system 100 includes a data utility system 102 comprising smart meter data 104 and a profile datastore 106. The smart meter data 104 can store information regarding historical usage such as, but not limited to, usage amount, usage trend, usage seasonality/cyclicity, and so on. In some embodiments, the smart meter data 104 is collected from a utility meter attached to a residence or business for supplying a utility such as, but not limited to, electricity, natural gas, water, and the like. Data utility system 102 further includes a profile datastore 106. Profile datastore 106 can include information regarding account numbers, customer names, demographic information, location information, preference information, feedback information, personality analysis (e.g., forward looking, green advocacy etc.), interaction analysis (e.g., keywords, tone, detail-oriented, etc.), social profile (social accounts, connections profile), historical information, and/or other profile-related information.

Propensity system 100 further includes a preprocessor system 108. Preprocessor system 108 includes a qualifier model 110 that uses qualifier constraints 112 for the purposes of removing disqualified candidates and retaining qualified candidates from the profile datastore 106. Preprocessor system 108 further includes a candidate profile datastore 114. The candidate profile datastore 114 can be the profile datastore 106 having disqualified candidates removed therefrom. Example qualifier constraints 112 used by the qualifier model 110 are discussed in more detail hereinafter with respect to FIG. 3.

Propensity system 100 further includes a prioritization model 116. The prioritization model 116 includes a scoring algorithm 118, an influence parameter datastore 120 including a magnitude of influence for each influence parameter, and a scored candidate profile datastore 122. The scored candidate profile datastore 122 can include a score (as determined by scoring algorithm 118 and influence parameter datastore 120) corresponding to each of the candidate profiles from the candidate profile datastore 114. The scoring algorithm 118 can be, for example, an Arrhenius equation that is suitable for characterizing a candidate's likelihood of opting into an additional or alternative product or service. Example scoring schemes are illustrated hereinafter with respect to FIGS. 4, 7, and 8. Likewise, an example influence parameter datastore 120 is illustrated hereinafter with respect to FIGS. 5 and 6.

Propensity system 100 further includes a communication modality model 124 that can be associated one or more of a plurality of communication channels 126 to each of the candidates in the scored candidate profile datastore 122. The communication channels 126 can include communication mechanisms such as, but not limited to, emails, electronic advertisements (e.g., browser-based advertisements, social media platform advertisements, etc.), instant messaging (IM), text messaging (e.g., short-message service (SMS) messaging), voice-based phone calls, social media-based interactions, and the like. An example set of communication channels 126 is shown hereinafter with respect to FIG. 9. The communication modality model 124 can associate a preferred one or more of the communication channels 126 to each of the profiles in the scored candidate profile datastore 122 based on communication influence parameters datastore 128. An example communication influence parameters datastore 128 is discussed hereinafter with respect to FIG. 10.

The propensity system 100 can further include a ranked candidate profile datastore 130 which can include the profiles in the scored candidate profile datastore 122 ranked according to the scores (e.g., as determined using scoring algorithm 118). Based on scores, customers with a higher propensity (e.g., a propensity above a threshold) can be selected. Customers with a higher propensity can be selected to determine preferred communication channel(s) as determined using the communication modality model 124. Furthermore, ranked candidate profile datastore 130 can include, for one or more of, or each of, the profiles in the ranked candidate profile datastore 130, a respective electronic communication 132. The electronic communication 132 can correspond to the preferred communication mechanism as determined by the communication modality model 124. In some embodiments, the propensity system 100 is configured to transmit one or more the electronic communications 132 to one or more client devices. In such embodiments, the transmitted electronic communications 132 can result in a higher proportion of customer engagements (e.g., opting into alternative payment models, adding new services, etc.) as a result of the prioritization model 116 (for identifying those customers most likely to be interested in alternative and/or additional services or products) and the communication modality model 124 (for identifying the communication channel that is most likely to be utilized by the identified customers).

Accordingly, aspects of the present disclosure can result in generating and transmitting electronic communications 132 to customers with increased efficiency (e.g., only sending communications to those customers predicted to be interested) and efficacy (e.g., sending communications in a communication channel(s) 126 most likely to inspire engagement by the customer).

As shown in FIG. 1, the data utility system 102, preprocessor system 108, prioritization model 116, communication modality model 124, and ranked candidate profile datastore 130 reside together within a propensity system 100. However, in other embodiments, one or more of the data utility system 102, preprocessor system 108, prioritization model 116, communication modality model 124, and/or ranked candidate profile datastore 130 can be communicatively coupled to one another by one or more permanent or intermittent networks. The one or more networks can be, for example, a wide area network (WAN), an intranet, the Internet, a personal area network (PAN), or another type of network.

Figure 2:
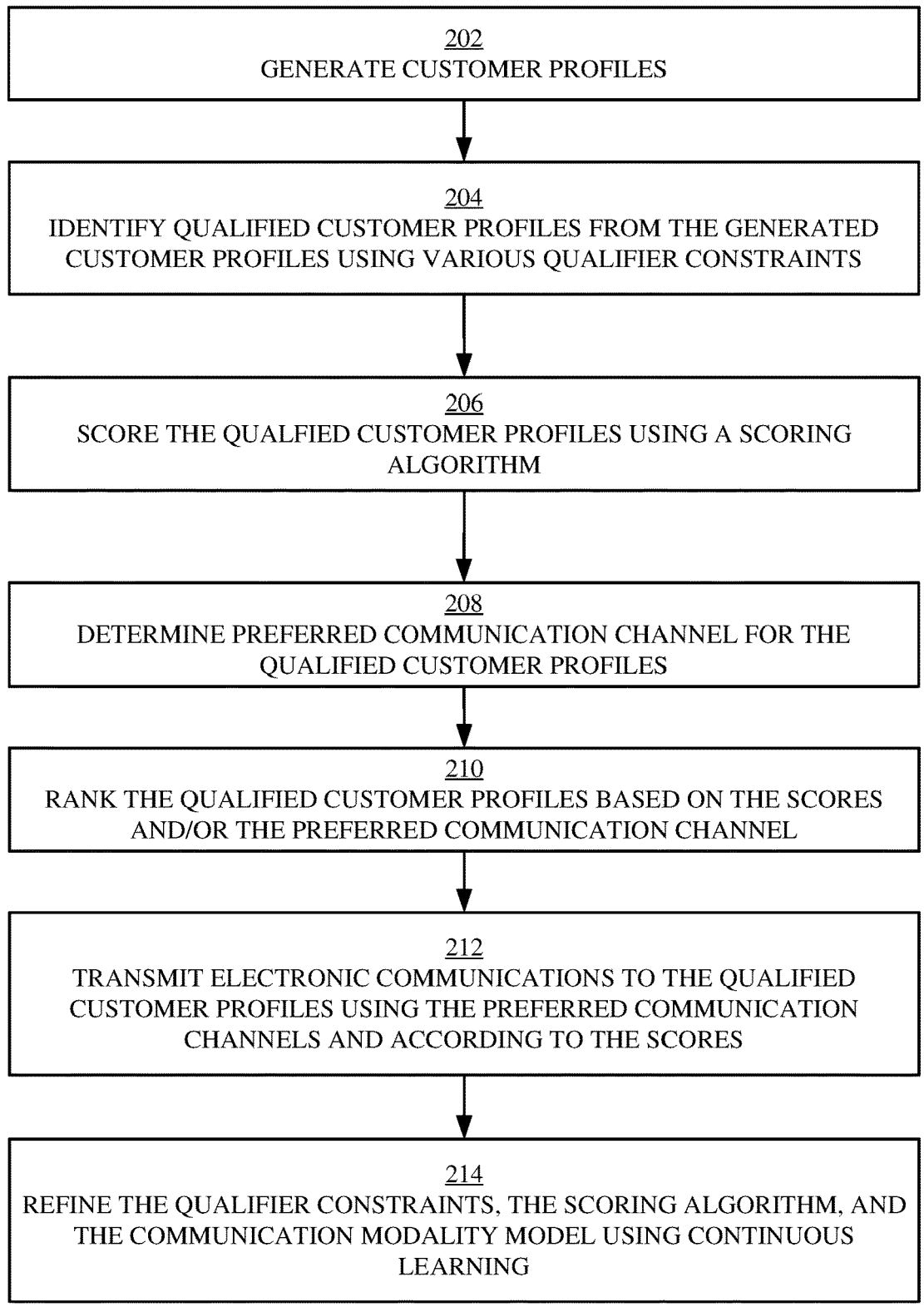
FIG. 2 illustrates a flowchart of an example method for utilizing a propensity system, in accordance with some embodiments of the present disclosure.

Referring now to FIG. 2, illustrated is a flowchart of an example method 200 for utilizing a propensity system, in accordance with some embodiments of the present disclosure. The method 200 can be implemented by, for example, a computer, a processor, the propensity system 100, or another configuration of hardware and/or software.

Operation 202 includes generating customer profiles. Customer profiles can include a variety of data sets such as a service data set, a customer data set, and/or a location data set. The service data set can include information such as, but not limited to, usage contracts (e.g., contract load, connection category, usage type, etc.), payment patterns (e.g., regular payments, missed payments, late payments, etc.), usage patterns (e.g., hourly, daily, and/or seasonal usage patterns, average consumption, maximum consumption, etc.), and/or other information. The customer data set can include data such as, but not limited to, customer interests (e.g., indications of green advocacy, etc.), customer request history (e.g., previous customer requests, complaints, etc.), demographic information, social profiles, and/or voucher usage. The location data set can include information such as, but not limited to, location information (e.g., country, region, state, municipality, address, etc.), community information (e.g., other customers in the area, a trend of increasing or decreasing customers in the area, etc.), and/or weather information for the location. In some embodiments, operation 202 stores the generated customer profiles in a profile datastore 106. In some embodiments, some of the data collected in operation 202 for generating the customer profiles is collected from smart meter data 104.

Operation 204 includes identifying qualified customer profiles from the generated customer profiles using various qualifier constraints. Example qualifier constraints are shown in table 300 of FIG. 3. As shown in table 300, example qualifier constraints can include, but are not limited to, (i) if a customer record indicates a predefined size (e.g., small, large, industrial), then that customer record can be eliminated; (ii) if a customer record does not satisfy an age criteria, then that customer record can be eliminated; (iii) if a customer record is related to medical services (e.g., a hospital), then that customer record can be eliminated; (iv) if a customer record is already configured for the proposed alternative or additional product or service (e.g., already configured for a prepayment or an accrual-based plan), then that customer record can be eliminated; (v) if a customer record satisfies a predefined size (e.g., residential, small commercial, etc.), then that customer record can be kept; (vi) if a customer record indicates designated equipment is already installed (e.g., a current transformer (CT)-based electricity meter), then that customer record can be eliminated; (vii) if a customer recently switched from or returned the alternative or additional product or service (e.g., switched from a prepaid plan to another plan, switched from an accrual-based plan to another plan), then that customer record can be eliminated. Thus, table 300 illustrates that qualifier constraints can include constraints that keep or remove customer records. In some embodiments, qualifier constraints that remove records can supersede other qualifier constraints that keep records, or vice versa, for customer records that satisfy a qualifier constraint indicating that the customer record should be kept and another qualifier constraint indicating that the customer record should be removed.

Referring again to FIG. 2, in some embodiments, operation 204 utilizes a preprocessor system 108. In some embodiments, a qualifier model 110 with qualifier constraints 112 is used to remove unqualified candidates from the profile datastore 106 and store the remaining (e.g., qualified) candidates in a candidate profile datastore 114.

Operation 206 includes scoring the qualified customer profiles using a scoring algorithm (e.g., scoring algorithm 118). In some embodiments, operation 206 includes using a scoring algorithm 118 and an influence parameter datastore 120 of a prioritization model 116 in order to generate scored candidate profile datastore 122, where the scored candidate profile datastore 122 includes, for each profile from candidate profile datastore 114, a score based on the scoring algorithm 118 and the influence parameter datastore 120.

Figure 4:
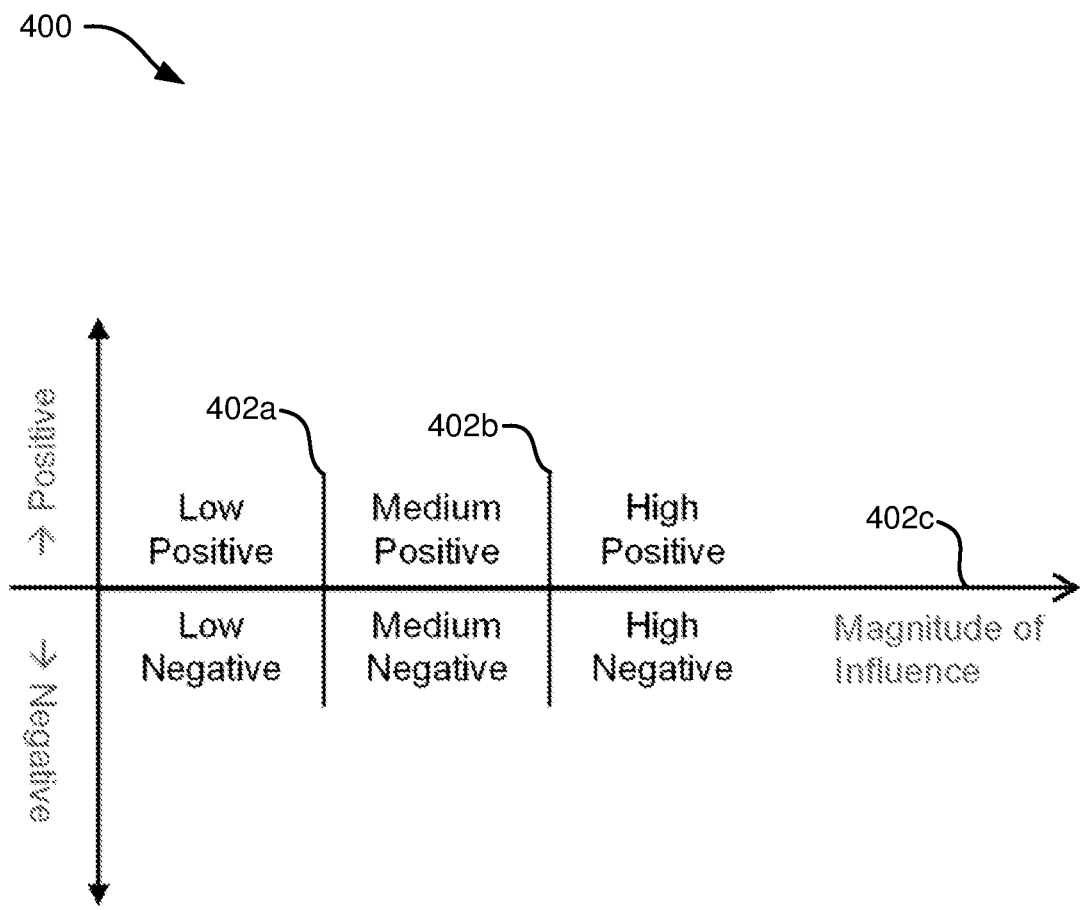
FIG. 4 illustrates a scoring scheme, in accordance with some embodiments of the present disclosure.

The graph 400 of FIG. 4 illustrates an example scoring scheme for the scores generated in operation 206. The graph 400 has an x-axis (e.g., horizontal axis) indicating a magnitude of influence and a y-axis (e.g., vertical axis) indicating a positive or negative sentiment associated with the magnitude of influence. In other words, for positive y-axis values, increasing x-values represent an increasing probability of a customer opting into or adding on an additional service or product, whereas for negative y-axis values, increasing x-axis values represent an increasing probability of a customer refusing to opt into or add on an additional service or product. The graph 400 can include separations 402 (e.g., 402a, 402b, and/or 402c) representing thresholds. For example, the threshold 402c separating positive from negative on the y-axis can be zero (where positive values represent positive customer sentiment regarding an additional or alternative product or service and where negative values represent negative customer sentiment regarding an additional or alternative product or service). As another example, the thresholds 402a and 402b demarcating the x-axis (e.g., separating low, medium, and high) can be static numbers or dynamic numbers that are modified on the basis of the distribution of scores (e.g., the graph 400 can be configured so that approximately 33% of scores fall in the low threshold, approximately 33% of scores fall in the medium threshold, and approximately 33% of scores fall in the high threshold).

Returning again to operation 206 of FIG. 2, in some embodiments, the scoring algorithm is based on the Arrhenius equation such as shown in Equation 1:

$$K = A^{-E/R}$$  Equation 1:

In Equation 1, K is the score representing a likelihood of a customer opting into or adding on a service or product. The variable A is a regional constant, the variable E denotes a magnitude of influence value, and the variable R denotes a number of services or products available given the E value.

For example, regional constant A can be a value greater than zero and less than one. In some embodiments, A can be based on a total number of customers who opted in or added on a given service or product in a region divided by a total number of customers in the region. In other embodiments, A can be based on a number of customers in in-sample data who opted in or added on a given service or product divided by the total number of customers in the in-sample data. In some embodiments, in-sample data can refer to data that is used to both create the model and train the model (e.g., on-the-fly training, just-in-time training, etc.). As yet another example, in some embodiments, A can be a regional constant from a similar region, where the similar region can have (i) a similar number of customers, (ii) a similar mix of services and/or products used by the customers, and/or (iii) a similar aggregate payment history (e.g., a similar amount of on-time and late payments).

The number of services or products available, R, can likewise be a value greater than zero and less than one. In some embodiments, R can be calculated for each influence parameter s and each of the number of services or products available. First, the total number of customers who opted in or added on a first product or service while meeting the influence parameter criteria s can be labeled as pt1. Second, the total number of customers who opted in or added on each other product or service while meeting the influence parameter criteria s can be labeled as pt2, and so on for pt3, . . . , ptn for n products or services. Third, the R value for a first product or service can be calculated as the pt1 divided by the sum of the other products or services (pt2, pt3, . . . , ptn).

Table 500 of FIG. 5 and table 600 of FIG. 6 illustrates example influence parameters s and their corresponding magnitudes of influence E. For example, as shown in table 500, (i) if a customer record indicates (e.g., as indicated from a customer profile) that the customer already uses, leases, or owns specified equipment (e.g., a smart meter), then that customer record can be associated with a high positive magnitude of influence for a given alternative or additional product or service; (ii) similarly to (i) if a customer record indicates that the customer already uses, leases, or owns another specified equipment (e.g., a digital or mechanical meter), then that customer record can be associated with a low positive magnitude of influence; (iii) if a customer record identifies a type of customer (e.g., resident tenant, etc.), then that customer record can be associated with a medium positive magnitude of influence; (iv) similarly to (iii), if a customer record identifies another type of customer (e.g., owner tenant, etc.), then that customer record can be associated with a low positive magnitude of influence; (v) if a customer record indicates at least one late payment in the last time frame (e.g., six months), then that customer record can be associated with a high positive magnitude of influence; (vi) if a customer record is associated with zero late payments, then that customer record can be associated with a low negative magnitude of influence; (vii) if a customer record indicates the customer has previously inquired (e.g., by phone, email, text, etc.) about an alternative or additional product or service, then that customer record can be associated with a medium positive magnitude of influence; (viii) if a customer record indicates that a certain type of customer pays by a certain method (e.g., a mobile application), then that customer record can be associated with a medium positive magnitude of influence; (ix) similarly to (viii), if a customer record indicates a certain type of customer pays by another method (e.g., on-site payment), then that customer record can be associated with a low negative magnitude of influence; (x) if a customer record indicates the customer is located in an area with a population density above a certain threshold, then that customer record can be associated with a medium positive magnitude of influence; (xi) if a customer record indicates the customer is located in an area with a population density below a threshold, then that customer record can be associated with a high negative magnitude of influence; (xii) if a customer record indicates a customer exhibits positive sentiment regarding an organization associated with an additional or alternative product or service, then that customer record can be associated with a medium positive magnitude of influence; (xiii) if a customer record indicates that a customer exhibited negative sentiment regarding an organization associated with an additional or alternative product or service, then that customer record can be associated with a medium negative magnitude of influence; (xiv) if a customer record indicates that the customer has previously exhibited interest in offers regarding other alternative or additional products or services, then that customer record can be associated with a medium positive magnitude of influence. Continuing the examples with respect to table 600 of FIG. 6, (xv) if a customer record indicates a customer has issued a number of complaints above a threshold, then that customer record can be associated with a low negative magnitude of influence; (xvi) if a customer record indicates the existence of a certain mobile phone service (e.g., a prepaid mobile service), then that customer record can be associated with a medium positive magnitude of influence; (xvii) similarly to (xvi) if a customer record indicates the existence of another type of mobile phone service (e.g., a postpaid mobile service), then that customer record can be associated with a low negative magnitude of influence; (xviii) if a customer record indicates a number above a threshold of the customer's social media connections have elected an additional or alternative product or service (e.g., a prepaid utility payment scheme, an accrual-based utility payment scheme, etc.), then that customer record can be associated with a medium positive magnitude of influence; (xix) if a customer record indicates other customers in a same vicinity as the customer have elected an additional or alternative product or service (e.g., a prepaid utility payment scheme, an accrual-based utility payment scheme, etc.), then that customer record can be associated with a high positive magnitude of influence; (xx) if a customer record indicates that a percentage of other customers in a same locality (e.g., block, city, county, region, etc.) as the customer have elected an additional or alternative product or service (e.g., a prepaid utility payment scheme, an accrual-based utility payment scheme, etc.), then that customer record can be associated with a high positive magnitude of influence; (xxi) if a customer record indicates that a customer's usage of a product or service has periodic troughs of usage (e.g., usage below an average usage for various intervals of hours, days, or weeks), then that customer record can be associated with a high positive magnitude of influence; (xxii) if a customer record indicates that customer has another account utilizing the alternative or additional product or service, then that customer record can be associated with a high positive magnitude of influence; (xxiii) if a customer record indicates that a customer's usage of a service is high during peak periods of usage, then that customer record can be associated with a medium positive magnitude of influence; (xxiv) if a customer record indicates that a housing category of the customer satisfies a predetermined category (e.g., apartment, condo, townhouse, etc.), then that customer record can be associated with a high positive magnitude of influence; (xxv) if a customer record indicates concerned customer sentiment regarding a current product or service (e.g., from social media), then that customer record can be associated with a high positive magnitude of influence.

As will be appreciated by one skilled in the art, table 500 and table 600 illustrate example parameters and example magnitudes of influence. In other embodiments, different parameters and/or different magnitude of influence values are utilized. In some embodiments, the parameters are retrieved from candidate profiles (e.g., from a candidate profile datastore 114).

In aggregate, the influence parameters s and their corresponding magnitudes of influence E displayed in FIGS. 5 and 6 can be used to determine the cumulative magnitude of influence variable E discussed above with respect to Equation 1.

Accordingly, each customer can be associated with a score $K_c$, where A and R can be defined as above, and where E can be a magnitude of influence for a given influence parameter s. Furthermore, the score K for each influence parameter can be a sum of all customer $K_c$ values with a same regional parameter R.

In some embodiments, operation 206 further includes determining a magnitude of influence affinity range as a value of all positive K-values plus and minus a standard deviation of K. Likewise, in some embodiments, a magnitude of influence disassociation range can be determined by all negative K-values plus and minus a standard deviation of K. In other words, the affinity range and disassociation range can be calculated according to Equation 2:

$$\text{Range} = (K - SD_K, K + SD_K) \quad \text{Equation 2:}$$

The magnitude of influence affinity and disassociation ranges can be used to determine an affinity value p and/or a disassociation value q for a given customer. In the case of an affinity value p, the affinity value p can be an absolute value the standard deviation of K subtracted from the customer's $K_c$ value, multiplied by one-hundred and divided by the magnitude of influence affinity range. In other words, affinity value p can be determined according to Equation 3:

$$p = \left| \frac{(K_c - SD_K) * 100}{\text{Range}_{affinity}} \right| \quad \text{Equation 3}$$

Similarly, the disassociation value q can be determined as an absolute value of the standard deviation of K subtracted from the customer's $K_c$ value, multiplied by one-hundred and divided by the magnitude of influence disassociation range. In other words, disassociation value q can be determined according to Equation 4:

$$q = \left| \frac{(K_c - SD_K) * 100}{\text{Range}_{disassociation}} \right| \quad \text{Equation 4}$$

Figure 7:
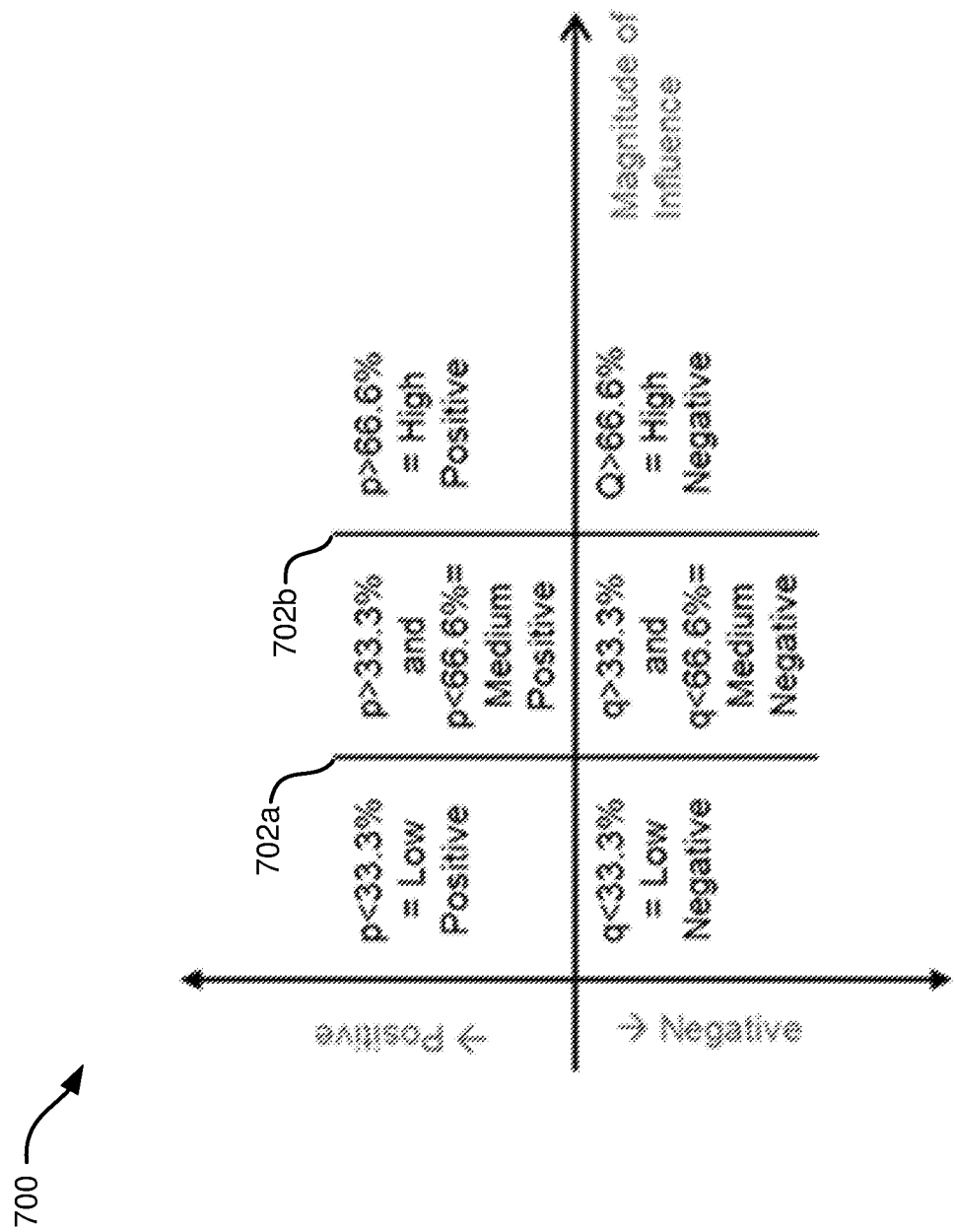
FIG. 7 illustrates another example scoring scheme, in accordance with some embodiments of the present disclosure.

FIG. 7 illustrates an example scoring scheme 700 (e.g., for the scores generated in operation 206 of FIG. 2) and based, at least in part, on the p-values generated in Equation 3 and the q-values generated in Equation 4. As shown in the scoring scheme 700, the x-axis (horizontal axis illustrating magnitude of influence) can be separated in three sections (e.g., where each section contains one-third (33.3%) of p-values or q-values) and the y-axis (vertical axis illustrating positive or negative sentiment) can be separated into two sections (e.g., positive and negative). In other words, the thresholds 702a and 702b can set to 33.3% and 66.6% for respective distributions of p-values and q-values.

After determining all the $K_c$ values, aspects of the present disclosure can calculate a propensity value by summing a count of high positives (count of influence parameters satisfied by the customer and with a magnitude of influence value of high positive), medium positives, low positives, and subtracting counts of high negatives, medium negatives, and low negatives. In some embodiments, weighting parameters are applied so that, for example, a high positive value is weighted more heavily than a low positive value.

Figure 8:
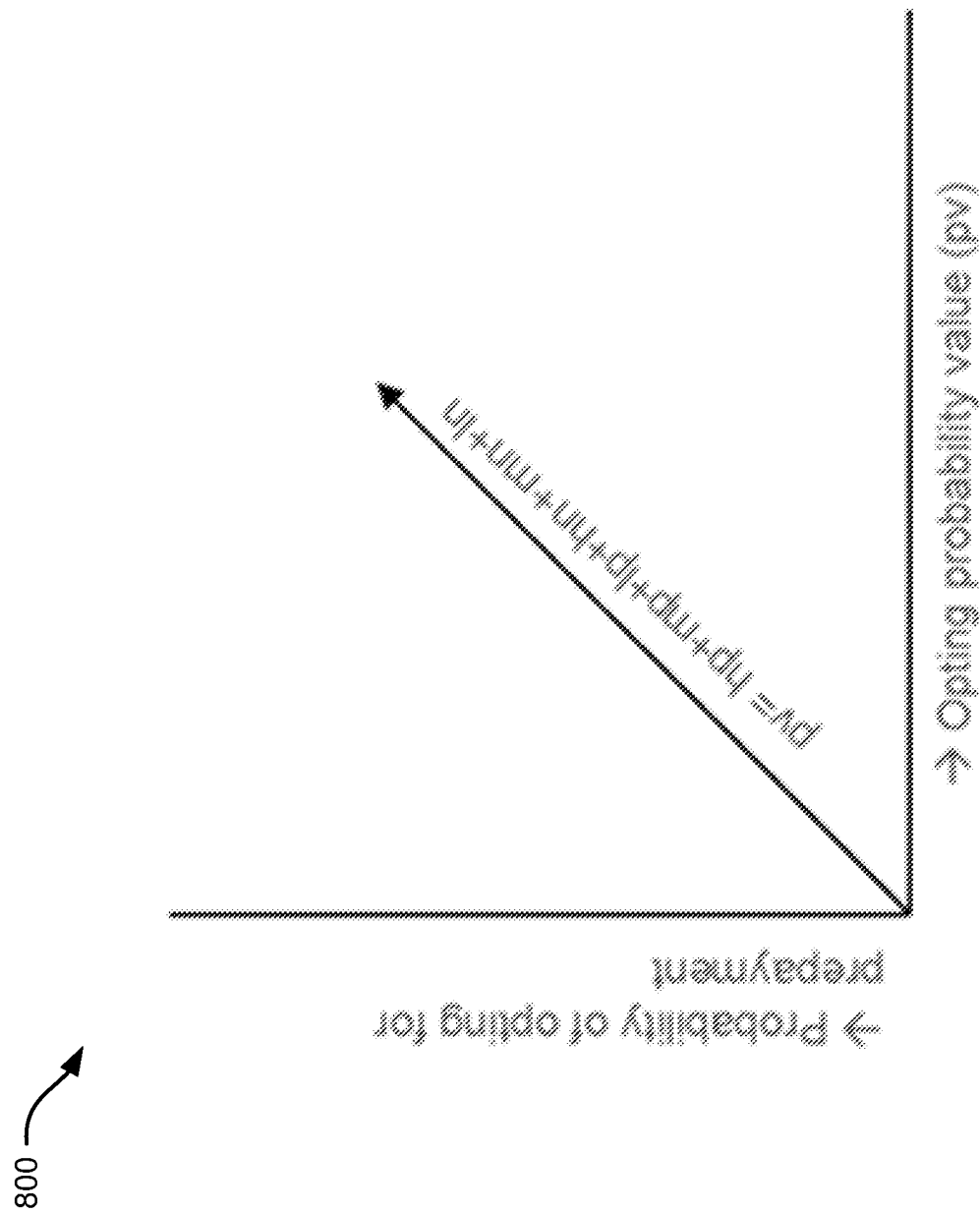
FIG. 8 illustrates an example probability graph, in accordance with some embodiments of the present disclosure.

FIG. 8 illustrates a graph 800 illustrating the opting probability value (on the horizontal, x-axis) versus the probability of opting for prepayment (on the vertical, y-axis). As can be seen, the function can be based on adding counts of high positives, medium positives, low positives, and subtracting counts of high negatives, medium negatives, and low negatives. In other embodiments, different products or services can be used on the y-axis.

Referring again to FIG. 2, operation 208 includes determining a preferred communication channel for one or more of the qualified customer profiles. The table 900 of FIG. 9 includes a variety of communication channels (e.g., communication channels 126 of FIG. 1). Table 900 includes communication channels such as short-message service (SMS), email (EML), push notification (PNF), phone call (PC), redemption vouchers (RV), and social media (SMED). Each of these communication channels can be weighted according to communication influence parameters (e.g., communication influence parameters datastore 128 of FIG. 1).

The table 1000 of FIG. 10 illustrates example communication influence parameters. As shown in FIG. 10, aspects of the present disclosure can collect parameters from customer profiles (e.g., from candidate profile datastore 114 or scored candidate profile datastore 122 of FIG. 1) and associate those parameters with one or more communication channels. Aspects of the present disclosure can utilize the information in table 1000 as applicable to respective candidate profiles together with a set of weighting values respectively corresponding to each of the communication channels to determine a preferred communication channel for each candidate customer profile. In so doing, aspects of the present disclosure can rank the relative value or utility of each communication channel for each candidate customer profile.

For example, as shown in the first record of table 1000 of FIG. 10, if a preferred mode of communication is selected in a candidate profile, that preferred mode can be incremented by one. The additional records in table 1000 illustrate other parameters and their corresponding increments. The respective communication channels can be ordered by number (or normalized number), where higher numbers represent relatively more frequently incremented communication channels and where lower numbers represent relatively less frequently incremented communication channels.

Numerous other example parameters are shown in table 1000 such as, but not limited to, (i) if a customer previously responded to a SMS message, the SMS communication channel can be incremented by one; (ii) if a customer's connection on a social media network opted for an alternative or additional service or product, and the customer has a number of interactions with the customer's connection above a threshold, then the social media communication channel can be incremented by one; (iii) if a customer has previously used gift vouchers for previous payments, then the redemption voucher communication channel can be incremented by one; (iv) if the customer has previously used gift vouchers at a partner organization, then the redemption voucher communication channel can be incremented by one; (v) if the customer previously opted for an alternative or additional product or service via any of the communication channels, then the respective communication channel can be incremented by one; (vi) if the customer has positively interacted with the organizations social media page, then the social media communication channel can be incremented by one; (vii) if the customer has previously interacted with the organization by email, then the email communication channel can be incremented by one; (viii) if the customer has previously interacted with the organization by phone, then the phone communication channel can be incremented by one. As will be appreciated by one of skill in the art, these are only examples, and additional parameters and incrementation schemes can be implemented in other embodiments. For example, different parameters can be associated with different incrementations as a mechanism to increase the weighting of certain parameters relative to other parameters.

Referring again to operation 208 of FIG. 2, after collecting the data and making the associations, aspects of the present disclosure can associate a preferred communication channel (or rank a set of communication channels from most preferred to least preferred) for each candidate customer profile of the qualified customer profiles (e.g., those customers listed in the candidate profile datastore 114 and/or the scored candidate profile datastore 122).

As will be appreciated by one skilled in the art, although operation 208 is shown subsequent to operation 206, in some embodiments, operation 208 can occur before operation 206 or operations 206 and 208 can occur in parallel.

Operation 210 includes ranking the qualified customer profiles based on the scores and/or the preferred communication channels. For example, a highest percentage of the scored candidate profiles can have an electronic communication transmitted to them by their preferred communication channel. As another example, a highest percentage of the scored candidate profiles that also have a certain preferred communication channel can have electronic communications transmitted to them by the certain preferred communication channel.

Operation 212 includes transmitting the electronic communications to the qualified customer profiles using the preferred communication channels and according to the scores.

Operation 214 includes refining the scoring qualifier constraints (e.g., qualifier constraints 112 of FIG. 1), the scoring algorithm 118, the influence parameter datastore 120, and/or the communication influence parameters datastore 128 based on feedback and continuous learning.

Figure 11:
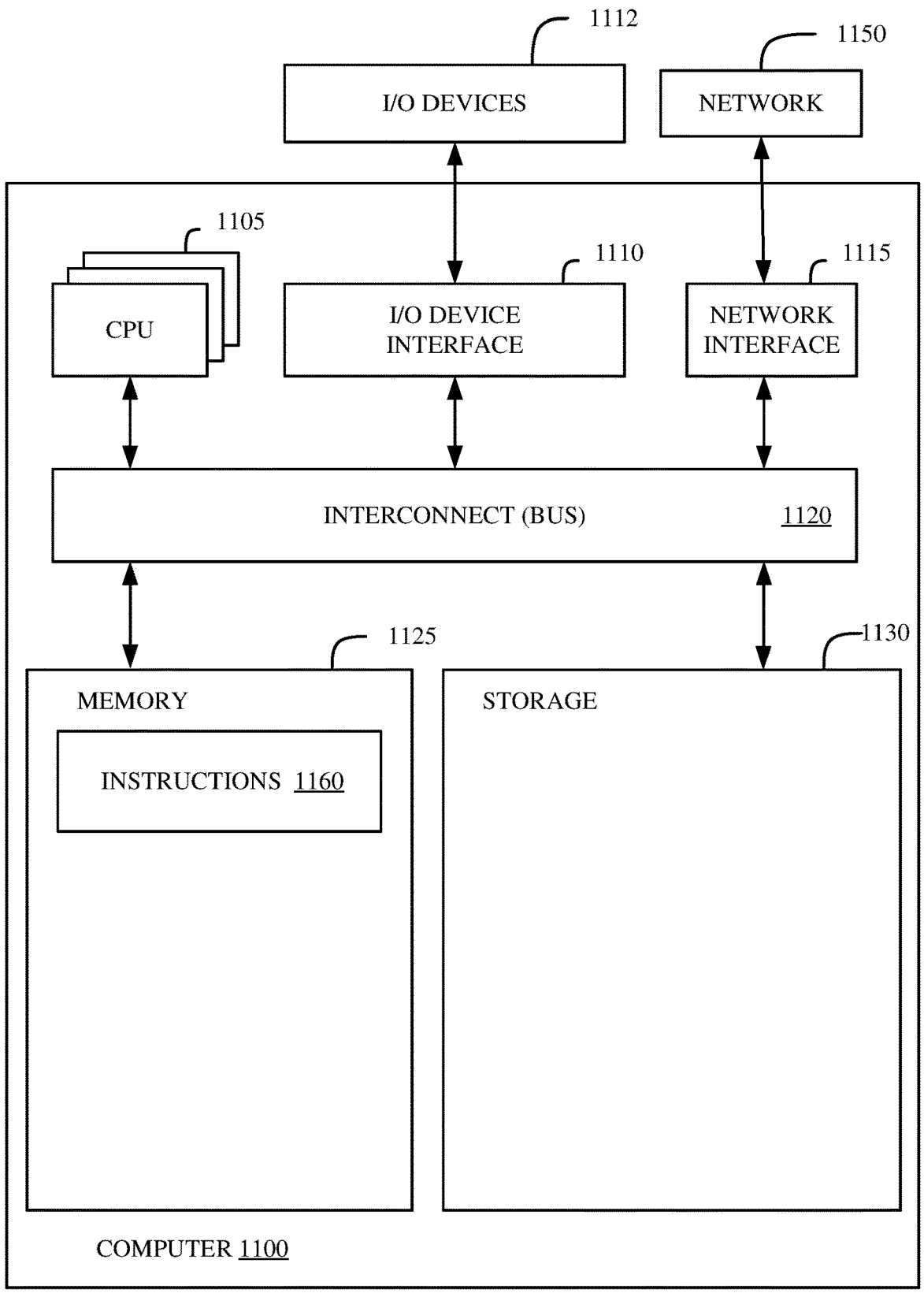
FIG. 11 illustrates a block diagram of an example computer, in accordance with some embodiments of the present disclosure.

FIG. 11 illustrates a block diagram of an example computer 1100 in accordance with some embodiments of the present disclosure. In various embodiments, computer 1100 can perform any or all of the methods described in FIG. 2 and/or implement the functionality discussed in one or more of FIGS. 1, and/or 3-10. In some embodiments, computer 1100 receives instructions related to the aforementioned methods and functionalities by downloading processor-executable instructions from a remote data processing system via network 1150. In other embodiments, computer 1100 provides instructions for the aforementioned methods and/or functionalities to a client machine such that the client machine executes the method, or a portion of the method, based on the instructions provided by computer 1100. In some embodiments, the computer 1100 is incorporated into (or functionality similar to computer 1100 is virtually provisioned to) the propensity system 100 and/or other aspects of the present disclosure.

Computer 1100 includes memory 1125, storage 1130, interconnect 1120 (e.g., BUS), one or more CPUs 1105 (also referred to as processors herein), I/O device interface 1110, I/O devices 1112, and network interface 1115.

Each CPU 1105 retrieves and executes programming instructions stored in memory 1125 or storage 1130. Interconnect 1120 is used to move data, such as programming instructions, between the CPUs 1105, I/O device interface 1110, storage 1130, network interface 1115, and memory 1125. Interconnect 1120 can be implemented using one or more busses. CPUs 1105 can be a single CPU, multiple CPUs, or a single CPU having multiple processing cores in various embodiments. In some embodiments, CPU 1105 can be a digital signal processor (DSP). In some embodiments, CPU 1105 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1125 is generally included to be representative of a random-access memory (e.g., static random-access memory (SRAM), dynamic random access memory (DRAM), or Flash). Storage 1130 is generally included to be representative of a non-volatile memory, such as a hard disk drive, solid state device (SSD), removable memory cards, optical storage, or flash memory devices. In an alternative embodiment, storage 1130 can be replaced by storage area-network (SAN) devices, the cloud, or other devices connected to computer 1100 via I/O device interface 1110 or network 1150 via network interface 1115.

In some embodiments, memory 1125 stores instructions 1160. However, in various embodiments, instructions 1160 are stored partially in memory 1125 and partially in storage 1130, or they are stored entirely in memory 1125 or entirely in storage 1130, or they are accessed over network 1150 via network interface 1115.

Instructions 1160 can be computer-readable and computer-executable instructions for performing any portion of, or all of, the method of FIG. 2 and/or implementing the functionality discussed in any portion of FIGS. 1 and/or 3-10. Although instructions 1160 are shown in memory 1125, instructions 1160 can include program instructions collectively stored across numerous computer-readable storage media and executable by one or more CPUs 1105.

In various embodiments, I/O devices 1112 include an interface capable of presenting information and receiving input. For example, I/O devices 1112 can present information to a user interacting with computer 1100 and receive input from the user.

Computer 1100 is connected to network 1150 via network interface 1115. Network 1150 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
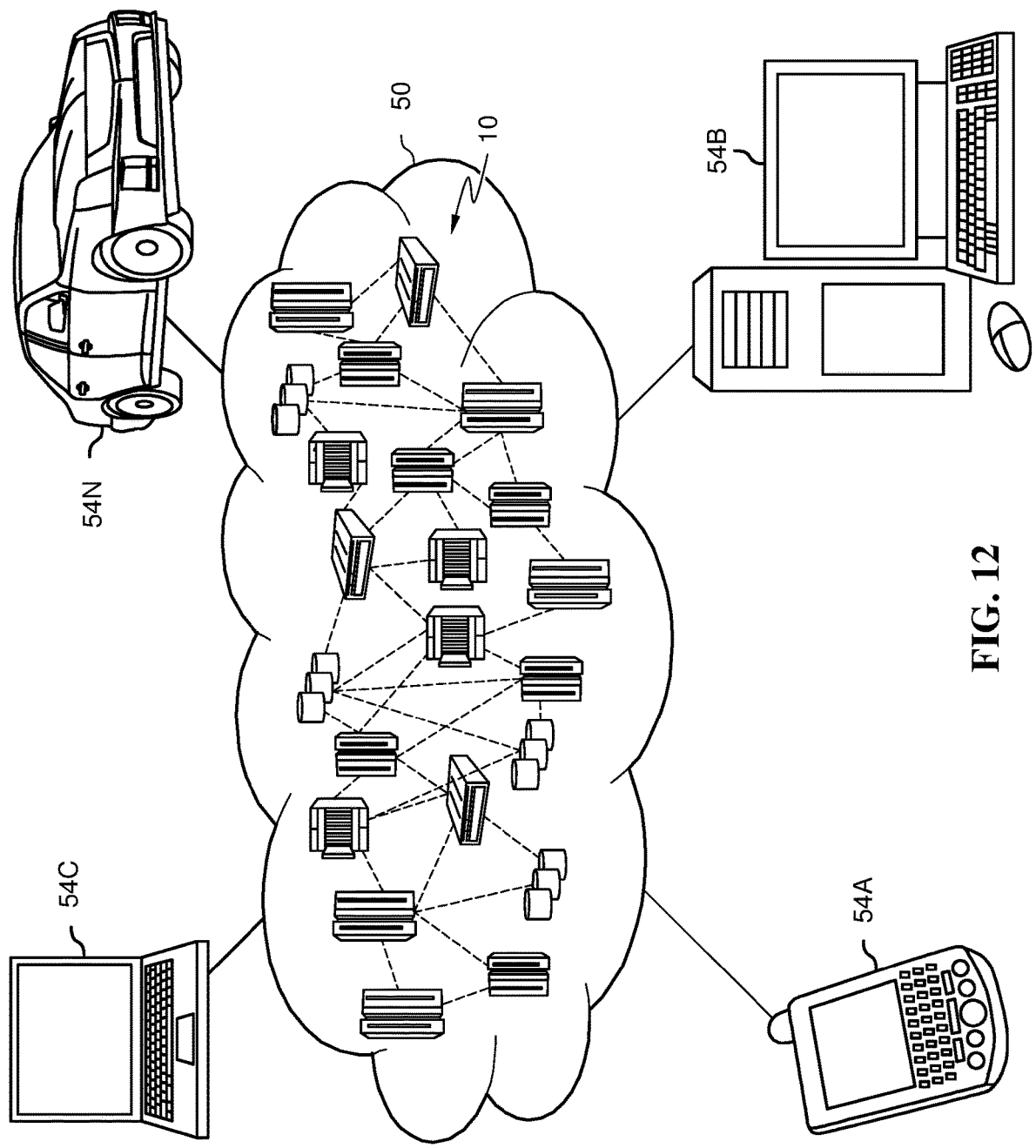
FIG. 12 depicts a cloud computing environment, in accordance with some embodiments of the present disclosure.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
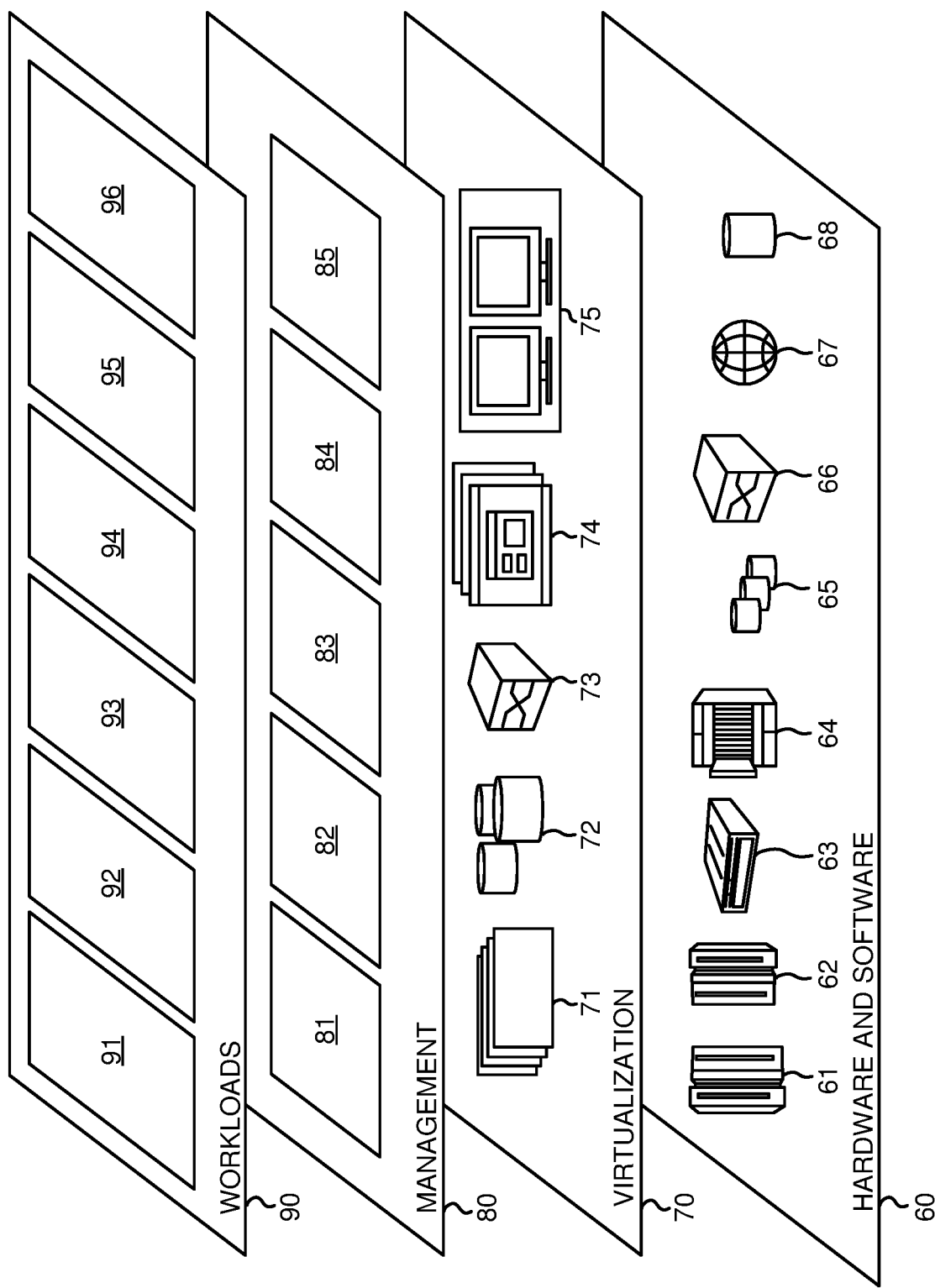
FIG. 13 depicts abstraction model layers, in accordance with some embodiments of the present disclosure.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective electronic communications 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 1160 of FIG. 11 and/or any software configured to perform any portion of the methods described with respect to FIG. 2 and/or implement any portion of the functionality discussed in FIGS. 1 and/or 3-10) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes generating customer profiles in a profile datastore; selecting a subset of the customer profiles for storing in a candidate profile datastore based on qualifier constraints in a qualifier model; scoring the subset of the customer profiles using a scoring algorithm; determining, for each of the subset of the customer profiles, a respective preferred communication channel; and transmitting, in an order according to a rank based on the scoring, electronic communications to a subset of the customer profiles using the respective preferred communication channels.

Example 2 includes the method of example 1, including or excluding optional features. In this example, the scoring algorithm is $K=A^{-E/R}$, wherein K is a score, A is a regional constant, E is a magnitude of influence parameter, and R is a number of options suitable for E. Optionally, A is based on a total number of users in a region that opted for a selected option of the number of options divided by a total number of users in the region. Optionally, A is based on a first number of users from in-sample data that opted for a selected option of the number of options divided by a total number of users in the in-sample data. Optionally, R is based on, for a given influence parameter criteria and a selected option of the number of options, a number of users that opted for the selected option compared to a total number of users that opted for any of the number of options.

Example 3 includes the method of any one of examples 1 to 2, including or excluding optional features. In this example, the customer profiles are electricity utility customer profiles, and wherein the scoring algorithm is configured to return higher scores for customer profiles more likely to opt into an alternative electrical service package and lower scores for customer profiles that are less likely to opt into the alternative electrical service package, and wherein the electronic communications include an offer related to the alternative electrical service package. Optionally, the alternative electrical service package is selected from a group consisting of: a prepaid electrical service package, and an accrual-based electrical service package.

Example 4 includes the method of any one of examples 1 to 3, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 5 is a system. The system includes one or more processors; and one or more computer-readable storage media storing program instructions which, when executed by the one or more processors, are configured to cause the one or more processors to perform a method according to any one of examples 1-4.

Example 6 is a computer program product. The computer program product comprising one or more computer readable storage media, and program instructions collectively stored on the one or more computer readable storage media, the program instructions comprising instructions configured to cause one or more processors to perform a method according to any one of Examples 1-4.

What is claimed is:

1. A computer-implemented method comprising:
    generating customer profiles in a profile datastore of an electric utility;
    selecting a subset of the customer profiles for storing in a candidate profile datastore based on qualifier constraints in a qualifier model;
    scoring the subset of the customer profiles using a scoring algorithm, wherein the scoring algorithm is configured to return higher scores for customer profiles more likely to opt into an alternative electrical service package and lower scores for customer profiles that are less likely to opt into the alternative electrical service package, and wherein the alternative electrical service package is selected from a group consisting of: a prepaid electrical service package, and an accrual-based electrical service package;
    determining, for each of the subset of the customer profiles, a respective preferred communication channel; and
    transmitting, in an order according to a rank based on the scoring, electronic communications including an offer related to the alternative electrical service package to a subset of the customer profiles using the respective preferred communication channels.

2. The method of claim 1, wherein the scoring algorithm is $K=A^{-E/R}$, wherein K is a score, A is a regional constant, E is a magnitude of influence parameter, and R is a number of options suitable for E.

3. The method of claim 2, wherein A is based on a total number of users in a region that opted for a selected option of the number of options divided by a total number of users in the region.

4. The method of claim 2, wherein A is based on a first number of users from in-sample data that opted for a selected option of the number of options divided by a total number of users in the in-sample data.

5. The method of claim 2, wherein R is based on, for a given influence parameter criteria and a selected option of the number of options, a number of users that opted for the selected option compared to a total number of users that opted for any of the number of options.

6. The method of claim 1, wherein the method is performed by one or more computers according to software that is downloaded to the one or more computers from a remote data processing system.

7. The method of claim 6, wherein the method further comprises:
    metering a usage of the software; and
    generating an invoice based on metering the usage.

8. The method of claim 1, wherein the alternative electrical service package is the prepaid electrical service package.

9. The method of claim 1, wherein the alternative electrical service package is the accrual-based electrical service package.

10. A system comprising:
    one or more processors; and
    one or more computer-readable storage media storing program instructions which, when executed by the one or more processors, are configured to cause the one or more processors to perform a method comprising:
    generating customer profiles in a profile datastore of an electric utility;
    selecting a subset of the customer profiles for storing in a candidate profile datastore based on qualifier constraints in a qualifier model;
    scoring the subset of the customer profiles using a scoring algorithm, wherein the scoring algorithm is configured to return higher scores for customer profiles more likely to opt into an alternative electrical service package and lower scores for customer profiles that are less likely to opt into the alternative electrical service package, and wherein the alternative electrical service package is selected from a group consisting of: a prepaid electrical service package, and an accrual-based electrical service package;

determining, for each of the subset of the customer profiles, a respective preferred communication channel; and transmitting, in an order according to a rank based on the scoring, electronic communications including an offer related to the alternative electrical service package to a subset of the customer profiles using the respective preferred communication channels.

11. The system of claim 10, wherein the scoring algorithm is $K=A^{-E/R}$, wherein K is a score, A is a regional constant, E is a magnitude of influence parameter, and R is a number of options suitable for E.

12. The system of claim 11, wherein A is based on a total number of users in a region that opted for a selected option of the number of options divided by a total number of users in the region.

13. The system of claim 11, wherein A is based on a first number of users from in-sample data that opted for a selected option of the number of options divided by a total number of users in the in-sample data.

14. The system of claim 11, wherein R is based on, for a given influence parameter criteria and a selected option of the number of options, a number of users that opted for the selected option compared to a total number of users that opted for any of the number of options.

15. A computer program product comprising one or more non-transitory computer readable storage media, and program instructions collectively stored on the one or more non-transitory computer readable storage media, the program instructions comprising instructions configured to cause one or more processors to perform a method comprising:

generating customer profiles in a profile datastore of an electric utility;

selecting a subset of the customer profiles for storing in a candidate profile datastore based on qualifier constraints in a qualifier model;

scoring the subset of the customer profiles using a scoring algorithm, wherein the scoring algorithm is configured to return higher scores for customer profiles more likely to opt into an alternative electrical service package and lower scores for customer profiles that are less likely to opt into the alternative electrical service package, and wherein the alternative electrical service package is selected from a group consisting of: a prepaid electrical service package, and an accrual-based electrical service package;

determining, for each of the subset of the customer profiles, a respective preferred communication channel; and transmitting, in an order according to a rank based on the scoring, electronic communications including an offer related to the alternative electrical service package to a subset of the customer profiles using the respective preferred communication channels.

16. The computer program product of claim 15, wherein the scoring algorithm is $K=A^{-E/R}$, wherein K is a score, A is a regional constant, E is a magnitude of influence parameter, and R is a number of options suitable for E.

17. The computer program product of claim 16, wherein A is based on a total number of users in a region that opted for a selected option of the number of options divided by a total number of users in the region.

18. The computer program product of claim 16, wherein A is based on a first number of users from in-sample data that opted for a selected option of the number of options divided by a total number of users in the in-sample data.

19. The computer program product of claim 16, wherein R is based on, for a given influence parameter criteria and a selected option of the number of options, a number of users that opted for the selected option compared to a total number of users that opted for any of the number of options.

* * * * *